(12) United States Patent
Yan et al.

(10) Patent No.: US 11,159,871 B2
(45) Date of Patent: Oct. 26, 2021

(54) SIGNAL TRANSMISSION CIRCUIT, SIGNAL TRANSMISSION METHOD, AND INTELLIGENT TERMINAL

(71) Applicant: HUIZHOU TCL MOBILE COMMUNICATION CO., LTD., Huizhou (CN)

(72) Inventors: Chunxia Yan, Huizhou (CN); Mingliang Liu, Huizhou (CN); Min Yao, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 16/651,332

(22) PCT Filed: Sep. 25, 2018

(86) PCT No.: PCT/CN2018/107343
§ 371 (c)(1),
(2) Date: Mar. 26, 2020

(87) PCT Pub. No.: WO2019/062711
PCT Pub. Date: Apr. 4, 2019

(65) Prior Publication Data
US 2020/0236455 A1 Jul. 23, 2020

(30) Foreign Application Priority Data
Sep. 26, 2017 (CN) .......................... 201710885383.9

(51) Int. Cl.
*H04R 1/10* (2006.01)
(52) U.S. Cl.
CPC .................................. *H04R 1/1041* (2013.01)

(58) Field of Classification Search
CPC .................................................... H04R 1/1041
See application file for complete search history.

(56) References Cited

U.S. PATENT DOCUMENTS

2007/0164861 A1 7/2007 Sano
2014/0003616 A1* 1/2014 Johnson ............... H04R 29/001
381/74

(Continued)

FOREIGN PATENT DOCUMENTS

CN 103945310 A 7/2014
CN 103974163 A 8/2014

(Continued)

OTHER PUBLICATIONS

Chinese First Office Action, application No. 201710885383.9, dated Apr. 8, 2020 (13 pages).

(Continued)

*Primary Examiner* — Jason R Kurr

(57) ABSTRACT

The present disclosure provides a signal transmission circuit, a signal transmission system, a signal transmission method, and an intelligent terminal. The signal transmission circuit includes an earphone interface circuit, a comparison circuit, and a control circuit. The earphone interface circuit is configured for connection to an audio receiving device. The comparison circuit is configured to acquire a voltage value corresponding to an impedance of the audio receiving device via the earphone interface circuit, the voltage value is compared with a reference voltage of the comparison circuit, to output a comparison result to the control circuit. The control circuit judges whether the audio receiving device is a digital audio device according to the comparison result, and switches the earphone interface circuit to digital output when the audio receiving device is determined to be a digital audio device.

19 Claims, 4 Drawing Sheets

(56) References Cited

U.S. PATENT DOCUMENTS

| | | | | |
|---|---|---|---|---|
| 2014/0029770 A1* | 1/2014 | Chien | ............... | H04R 3/00 |
| | | | | 381/123 |
| 2015/0304769 A1* | 10/2015 | Weijand | ............ | H04R 29/001 |
| | | | | 381/123 |
| 2016/0157008 A1* | 6/2016 | Zhang | ............ | H04R 1/1041 |
| | | | | 381/74 |
| 2017/0064456 A1* | 3/2017 | Backman | .......... | H04R 29/001 |

FOREIGN PATENT DOCUMENTS

| | | |
|---|---|---|
| CN | 105635902 A | 6/2016 |
| CN | 107908387 A | 4/2018 |

OTHER PUBLICATIONS

International search report, PCT/CN2018/107343 dated Apr. 1, 2019 (2 pages).

\* cited by examiner

SIGNAL TRANSMISSION CIRCUIT, SIGNAL TRANSMISSION METHOD, AND INTELLIGENT TERMINAL

CROSS-REFERENCE TO RELATED APPLICATIONS

The present application is a 35 U.S.C. § 371 National Phase conversion of International (PCT) Patent Application No. PCT/CN2018/107343 filed on Sep. 25, 2018, which claims priority of Chinese Patent Application No. 201710885383.9, filed on Sep. 26, 2017 in the National Intellectual Property Administration of China, the contents of all of which are hereby incorporated by reference.

TECHNICAL FIELD

The described embodiments relate to the field of signal transmission of an intelligent terminal, and particularly to a signal transmission circuit, a signal transmission method, and an intelligent terminal.

BACKGROUND

With the development of electronic technology and continuous improvement of people's living standards, various intelligent terminals are becoming increasingly popular. More and more people expect intelligent terminals to be able to output corresponding audio signals according to types of external audio devices.

Currently, intelligent terminals generally can output only analog audio signals, or can output only digital audio signals, and cannot output corresponding audio signals according to types of the external audio devices.

SUMMARY

A first aspect of the present disclosure provides an intelligent terminal, wherein the intelligent terminal includes a signal transmission circuit. The signal transmission circuit includes: an earphone interface circuit, a comparison circuit, and a control circuit electrically connected in sequence. The earphone interface circuit is configured for connection to an audio receiving device. The comparison circuit is configured to acquire a voltage value corresponding to an impedance of the audio receiving device via the earphone interface circuit. The voltage value is compared with a reference voltage of the comparison circuit, to output a comparison result to the control circuit. The control circuit judges whether the audio receiving device is a digital audio device according to the comparison result, and switches the earphone interface circuit to digital output when the audio receiving device is determined to be a digital audio device.

A second aspect of the present disclosure provides a signal transmission method, wherein the signal transmission method includes: acquiring, by an intelligent terminal via an earphone interface circuit thereof, a voltage value corresponding to impedance of an audio receiving device; comparing the voltage value with a reference voltage of a comparison circuit in the intelligent terminal to obtain a comparison result; judging whether the audio receiving device is a digital audio device according to the comparison result; if yes, switching the earphone interface circuit to digital output.

A third aspect of the present disclosure provides a signal transmission circuit, wherein the signal transmission circuit includes: an earphone interface circuit, a comparison circuit, and a control circuit electrically connected in sequence. The earphone interface circuit is configured for connection to an audio receiving device. The comparison circuit is configured to acquire a voltage value corresponding to an impedance of the audio receiving device via the earphone interface circuit, the voltage value is compared with a reference voltage of the comparison circuit, to output a comparison result to the control circuit. The control circuit judges whether the audio receiving device is a digital audio device according to the comparison result, and switches the earphone interface circuit to digital output when the audio receiving device is determined to be a digital audio device.

DETAILED DESCRIPTION

The present disclosure provides a signal transmission circuit, a signal transmission system, a signal transmission method, and an intelligent terminal. In order to make the purpose, technical solution, and technical effect of the present disclosure determinate and clear, the present disclosure will be described below in more detail. It should be understood that the embodiments described herein are employed merely to interpret the present disclosure, rather than limit the present disclosure.

Figure 1:
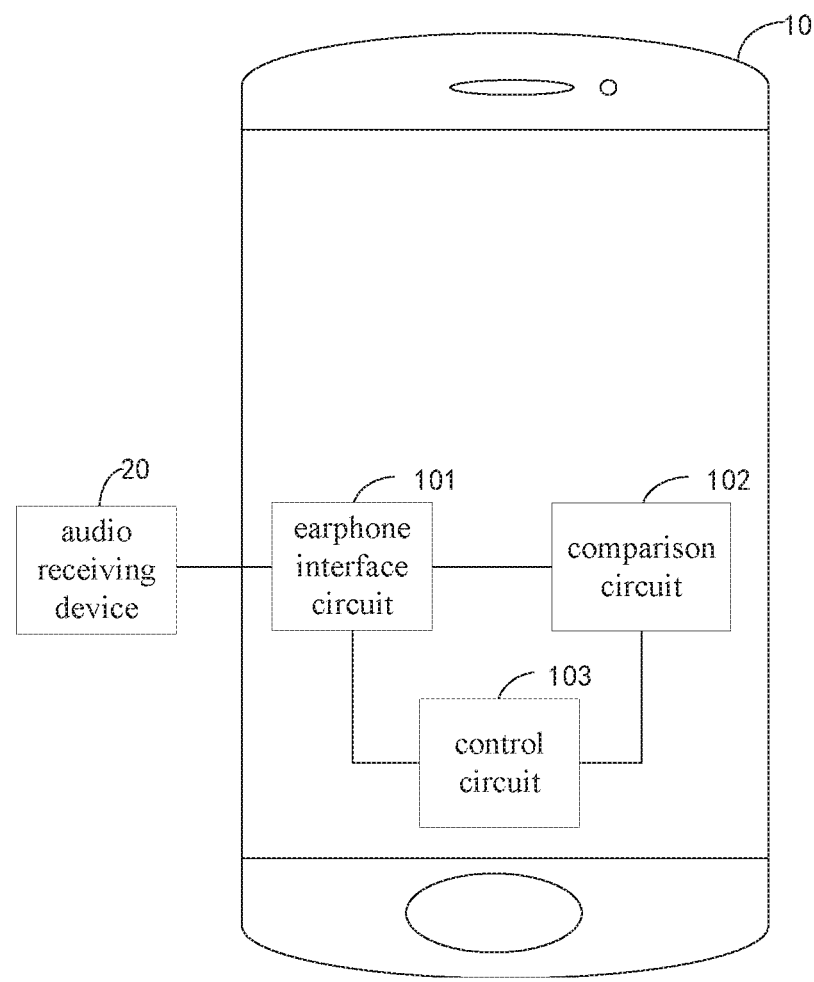
FIG. 1 is a schematic structural diagram of an embodiment of a signal transmission system of the present disclosure.

Reference is made to FIG. 1, which is a schematic structural diagram of an embodiment of a signal transmission system of the present disclosure. The signal transmission system in the present embodiment includes an intelligent terminal 10 and an audio receiving device 20.

The intelligent terminal 10 may be a smart phone, a tablet computer, and an intelligent TV, without any specific limitation set herein.

The audio receiving device 20 may be an earphone and a loudspeaker, without any specific limitation set herein.

In the present embodiment, the intelligent terminal 10 further includes a signal transmission circuit. The signal transmission circuit includes an earphone interface circuit 101, a comparison circuit 102, and a control circuit 103 electrically connected in sequence.

The earphone interface circuit 101 is configured for connection to the audio receiving device 20. The comparison circuit 102 is configured to acquire a voltage value corresponding to an impedance of the audio receiving device 20 via the earphone interface circuit 101, to compare the acquired voltage value with a reference voltage of the comparison circuit 102, and to output a comparison result to the control circuit 103. The control circuit 103 judges whether the audio receiving device 20 is a digital audio device according to the comparison result, and switches the earphone interface circuit 101 to digital output when the audio receiving device 20 is determined to be a digital audio device.

In the present embodiment, the earphone interface circuit 101 includes an earphone socket, and the audio receiving device 20 includes an earphone plug. When the earphone plug of the audio receiving device 20 is in contact connection with the earphone socket of the earphone interface circuit 101, and corresponding signal terminals of the two make an electrical connection, i.e., audio tracks and microphone channels of the two are correspondingly electrically connected, so that the audio receiving device 20 can receive corresponding audio signals.

In another embodiment, the audio receiving device 20 includes an earphone socket, and the audio receiving device 20 and the earphone interface circuit 101 make an electrical connection via an audio cable mating with the earphone socket, so that the audio receiving device can receive corresponding audio signals.

In the present embodiment, when the audio receiving device 20 is an analog audio receiving device, signals transmitted by the intelligent terminal 10 via the earphone interface circuit 101 are analog audio signals. When the audio receiving device 20 is a digital audio receiving device, the intelligent terminal 10 transmits corresponding digital audio signals via the earphone interface circuit 101.

Figure 2:
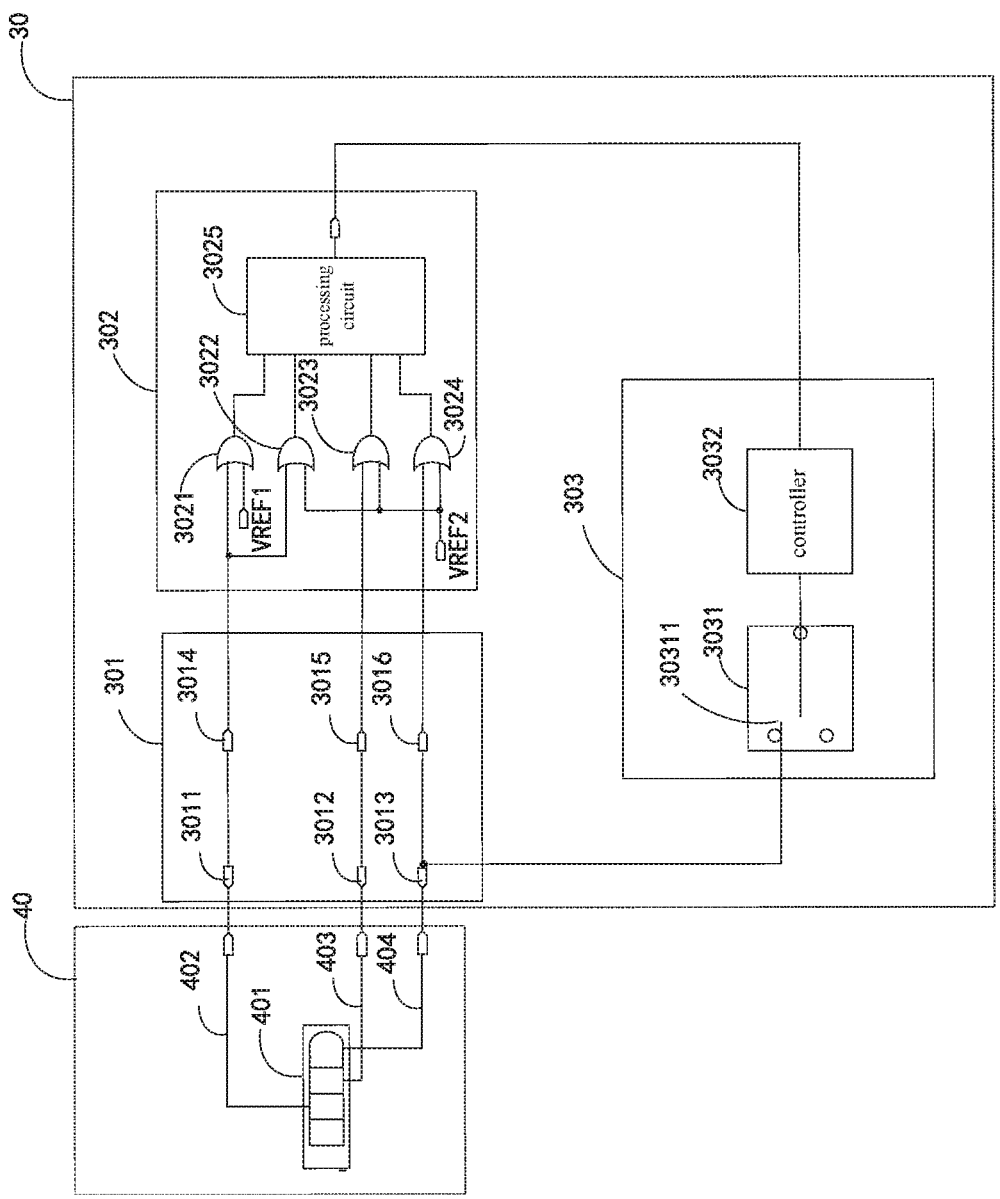
FIG. 2 is a schematic structural diagram of an embodiment of a signal transmission circuit of the present disclosure.

In order to clearly describe the signal transmission circuit of the foregoing embodiment, reference is made to FIG. 2, which is a schematic structural diagram of an embodiment of a signal transmission circuit of the present disclosure.

As shown in FIG. 2, that the audio receiving device 40 includes an earphone plug 401 is exemplified for explanation. The earphone plug 401 is a plug with four segments corresponding to different signals, namely, ground, microphone, right sound track, and left sound track, respectively. The microphone, the right sound track, and the left sound track of the earphone plug 401 are connected to a peripheral circuit to form a microphone channel 402, a first sound track 404, and a second sound track 403, respectively. When the type of the audio receiving device 40 is different, impedance values corresponding to the microphone channel 402, the first sound track 404, and the second sound track 403 are also different.

In an embodiment, when the earphone plug 401 of the audio receiving device 40 is electrically connected to an earphone interface circuit 301 in a signal transmission circuit 30, an input terminal 3011 of a microphone channel of the earphone interface circuit 301 is connected to the microphone channel 402 of the audio receiving device 40; an input terminal 3013 of a first sound track of the earphone interface circuit 301 is connected to the first sound track 404 of the audio receiving device 40; and an input terminal 3012 of a second sound track of the earphone interface circuit 301 is connected to the second sound track 403 of the audio receiving device 40.

The comparison circuit 302 includes a first comparison channel 3021, a second comparison channel 3022, a third comparison channel 3023, and a fourth comparison channel 3024. An output terminal 3016 of the first sound track of the earphone interface circuit 301 is connected to a first input terminal of the fourth comparison channel 3024, so that the fourth comparison channel 3024 may acquire a voltage value corresponding to an impedance of the first sound track 404 of the audio receiving device 40. An output terminal 3015 of the second sound track of the earphone interface circuit 301 is connected to a first input terminal of the third comparison channel 3023, so that the third comparison channel 3023 may acquire a voltage value corresponding to an impedance of the second sound track 403 of the audio receiving device 40. An output terminal 3014 of the microphone channel of the earphone interface circuit 301 is connected to a first input terminal of the first comparison channel 3021 and a first input terminal of the second comparison channel 3022, respectively, so that the first comparison channel 3021 and the second comparison channel 3022 may respectively acquire a voltage value corresponding to an impedance of the microphone channel 402 of the audio receiving device 40.

Furthermore, a second input terminal of the first comparison channel 3021 is electrically connected to a first reference voltage VREF1, and each of second input terminals of the second comparison channel 3022, the third comparison channel 3023, and the fourth comparison channel 3024 is electrically connected to a second reference voltage VREF2. The first comparison channel 3021, the second comparison channel 3022, the third comparison channel 3023, and the fourth comparison channel 3024 respectively compare voltages acquired by their first input terminals with the reference voltages of the second input terminals thereof to obtain corresponding comparison results. Specifically, the first comparison channel 3021 compares the acquired voltage value with the first reference voltage VREF1 to obtain a first comparison result; the second comparison channel 3022 compares the acquired voltage value with the second reference voltage VREF2 to obtain a second comparison result; the third comparison channel 3023 compares the acquired voltage value with the second reference voltage VREF2 to obtain a third comparison result; and the fourth comparison channel 3024 compares the acquired voltage value with the second reference voltage VREF2 to obtain a fourth comparison result.

The comparison circuit 302 further includes a processing circuit 3025. The processing circuit 3025 processes the first comparison result, the second comparison result, the third comparison result, and the fourth comparison result according to a preset operation to obtain and output a comparison result. The preset operation includes an AND operation. In the present embodiment, only when the first comparison result, the second comparison result, the third comparison result, and the fourth comparison result are all high level, the comparison result output by the comparison circuit 302 is high level; otherwise low level is output. At this time, the control circuit 303 can determine that the audio receiving device 40 is a digital audio device according to the comparison result, and output digital audio signals to the audio receiving device 40 via the earphone interface circuit 301.

Specifically, the control circuit 303 includes a controller 3032 electrically connected to the comparison circuit 302 and a single-pole double-throw (SPDT) switch 3031 connected to the controller 3032. The controller 3032 is configured to receive the comparison result output by the comparison circuit 302 and to determine the type of the audio receiving device 40 according to the comparison result. When the audio receiving device 40 is determined to be a digital audio device, the controller 3032 controls a switch branch where a free terminal 30311 of the SPDT switch 3031 lies to conduct. At this time, the input terminal 3013 of the first sound track of the earphone interface circuit 301 and the control circuit 303 are conducting, so that the signal transmission circuit 30 may output digital signals to the audio receiving device 40 via the earphone interface circuit 301.

Figure 3:
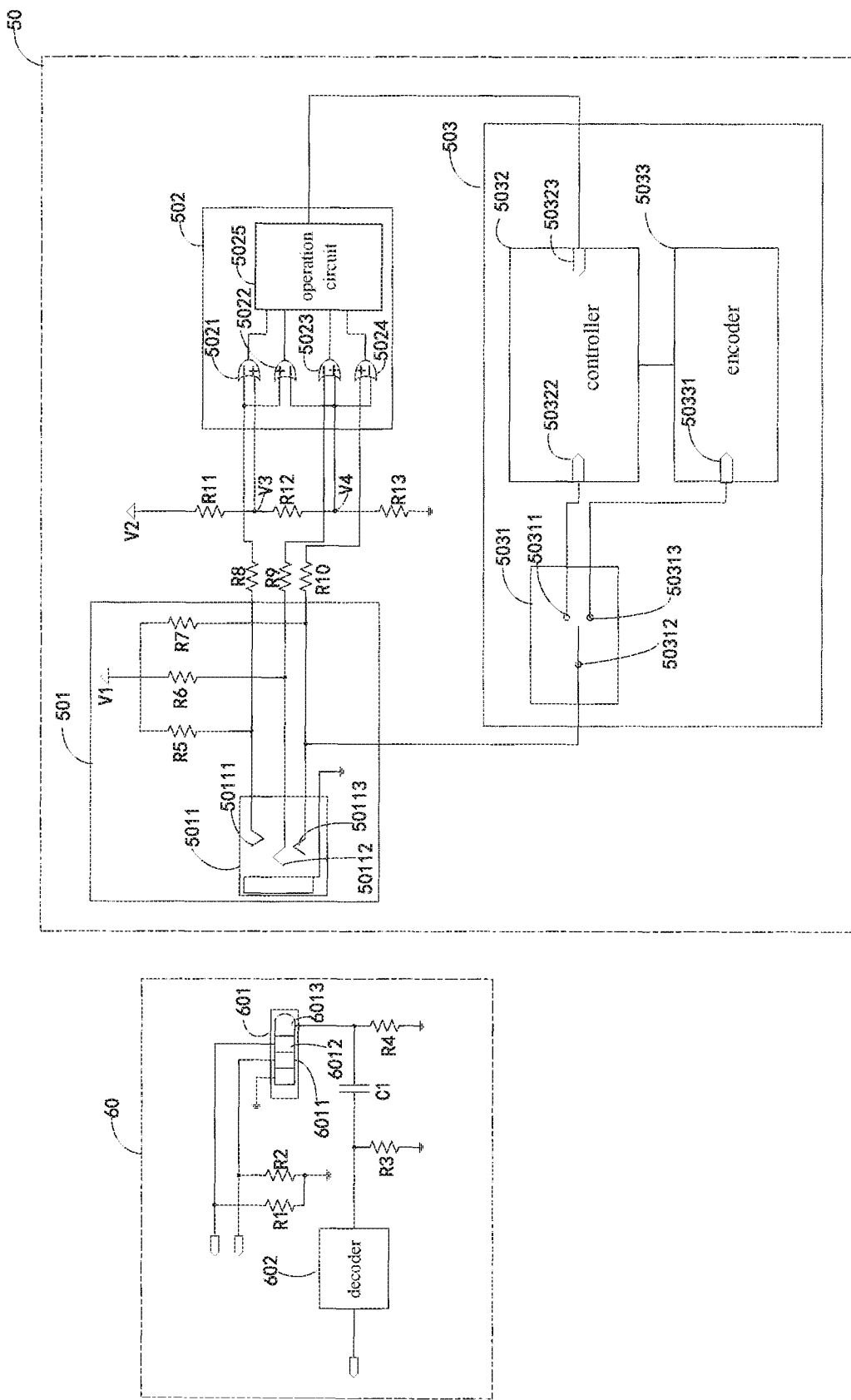
FIG. 3 is a schematic circuit diagram of an embodiment of a signal transmission circuit of the present disclosure.

In order to more clearly explain working principles of the signal transmission circuit of any one of the foregoing embodiments, reference is made to FIG. 3, which is a schematic circuit diagram of an embodiment of a signal transmission circuit of the present disclosure.

As shown in FIG. 3, a signal transmission circuit 50 includes an earphone interface circuit 501, a comparison circuit 502, and a control circuit 503.

Components included in the earphone interface circuit 501, the comparison circuit 502, and the control circuit 503 and their working principles are described below in detail in conjunction with FIG. 3.

The earphone interface circuit 501 includes an earphone socket 5011. The earphone socket 5011 includes a plurality of signal pins, such as a microphone signal pin 50111, a right sound track signal pin 50112, and a left sound track signal pin 50113. Through the earphone socket 5011, an external device can, together with the earphone interface circuit 501, form a corresponding signal pathway, whereby audio signals may be transmitted.

Further, in the process of transmitting the audio signals, corresponding pull-up resistors are provided respectively at the microphone signal pin 50111, the right sound track signal pin 50112 and the left sound track signal pin 50113 to reduce interference of the audio signals. Specifically, the microphone signal pin 50111 is electrically connected to a terminal of a resistor R5, and the other terminal of the resistor R5 is electrically connected to a power source V1; the right sound track signal pin 50112 is electrically connected to a terminal of a resistor R6, and the other terminal of the resistor R6 is electrically connected to the power source V1; and the left sound track signal pin 50113 is electrically connected to a terminal of a resistor R7, and the other terminal of the resistor R7 is electrically connected to the power source V1. Therein, resistance values of the resistor R5, the resistor R6, and the resistor R7 can be 100KΩ, and the power source V1 supplies, to the interface circuit, power, which is generally 3.3V and can be designed according to actual circumstances.

The comparison circuit 502 includes a first comparison channel 5021, a second comparison channel 5022, a third comparison channel 5023, and a fourth comparison channel 5024. Each of the comparison channels includes a comparison voltage terminal and a reference voltage terminal.

Specifically, the comparison voltage terminal of the first comparison channel 5021 and the microphone signal pin 50111 make an electrical connection via a resistor R8, and the reference voltage terminal of the first comparison channel 5021 and a first reference voltage V3 make an electrical connection. The comparison voltage terminal of the second comparison channel 5022 and the microphone signal pin 50111 make an electrical connection via a resistor R8, and the reference voltage terminal of the second comparison channel 5022 and a second reference voltage V4 make an electrical connection. The first comparison channel 5021 and the second comparison channel 5022 constitute a window comparator.

The comparison voltage terminal of the third comparison channel 5023 and the right sound track signal pin 50112 make an electrical connection via a resistor R9, and the reference voltage terminal of the third comparison channel 5023 and the second reference voltage V4 make an electrical connection. The comparison voltage terminal of the fourth comparison channel 5024 and the left signal pin 50113 make an electrical connection via a resistor R10, and the reference voltage terminal of the fourth comparison channel 5024 and the second reference voltage V4 make an electrical connection.

It should be noted that, a signal pin of the earphone socket 5011 may also directly be electrically connected to the comparison circuit 502. In the present embodiment, the resistors R8, R9, and R10 are added to reduce the interference of the audio signals. Therein, resistance values of the resistors R8, R9, and R10 are 10 KΩ.

Specific production manners of the first reference voltage V3 and the second reference voltage V4 and configuration of corresponding voltage values are explained below in conjunction with FIG. 3.

The signal transmission circuit 50 further includes a resistor R11, a resistor R12, and a resistor R13. A terminal of the resistor R11 is electrically connected to a power source V2; the other terminal of the resistor R11 is connected to a terminal of the resistor R12; the other terminal of the resistor R12 is connected to a terminal of the resistor R13; and the other terminal of the resistor R13 is grounded to form a series relationship.

The first reference voltage V3 is a voltage assigned to the resistor R12 and the resistor R13, and the specific value is calculated according to the following formula I:

$$V_3 = \frac{R_{12} + R_{13}}{R_{11} + R_{12} + R_{13}} * V_2, \quad \text{(Formula I)}$$

where $V_3$ is a voltage value of the first reference voltage V3, $R_{11}$ is a resistance value of the resistor R11, $R_{12}$ is a resistance value of the resistor R12, $R_{13}$ is a resistance value of the resistor R13, and $V_2$ is a voltage value of the power source V2.

The second reference voltage V4 is a voltage assigned to the resistor R13, and the specific value is calculated according to the following formula II:

$$V_4 = \frac{R_{13}}{R_{11} + R_{12} + R_{13}} * V_2, \quad \text{(Formula II)}$$

where $V_4$ is a voltage value of the second reference voltage V4, $R_{11}$ is a resistance value of the resistor R11, $R_{12}$ is a resistance value of the resistor R12, $R_{13}$ is a resistance value of the resistor R13, and $V_2$ is a voltage value of the power source V2.

In the present embodiment, in conjunction with FIG. 3, the working principles of the respective comparison channels in the comparison circuit 502 are as follows. When the voltage value acquired by the comparison voltage terminal of the first comparison channel 5021 is smaller than the first reference voltage V1, the first comparison channel 5021 outputs high level; otherwise it outputs low level. When the voltage value acquired by the comparison voltage terminal of the second comparison channel 5022 is greater than the second reference voltage V2, the second comparison channel 5022 outputs high level; otherwise it outputs low level. When the voltage value acquired by the comparison voltage terminal of the third comparison channel 5023 is greater than the second reference voltage V2, the third comparison channel 5023 outputs high level; otherwise it outputs low level. When the voltage value acquired by the comparison voltage terminal of the fourth comparison channel 5024 is smaller than the second reference voltage V2, the fourth comparison channel 5024 outputs high level, otherwise it outputs low level.

The comparison circuit 502 further includes an AND operation circuit 5025. The operation circuit 5025 is configured to perform an AND operation of corresponding results output by the first comparison channel 5021, the second comparison channel 5022, the third comparison channel 502, and the fourth comparison channel 5024 to obtain and output a comparison result.

It should be emphasized herein that, the comparison circuit 502 may include a multi-channel comparator, e.g., a chip LMV339 with low power consumption, low voltage and small package, and may also include multiple single-channel comparators. Signals accessed by a reference voltage input terminal of the comparator may be designed according to the working principle of the selected comparator, and it is applicable as long as the same comparison effect as that of the present embodiment is attainable.

The control circuit 503 includes a switch 5031, a controller 5032, and an encoder 5033. The controller 5032 includes a plurality of signal terminals. One of the signal terminals 50323 and the comparison circuit 502 make an electrical connection for receiving a comparison result of the comparison circuit 502. The signal terminal 50322 and one of free terminals 50311 of the switch 5031 make an electrical connection. The switch 5031 is a SPDT switch and includes a fixed terminal 50312, a free terminal 50311, and a free terminal 50313, where the fixed terminal 50312 and the left sound track signal pin 50113 of the earphone socket 5011 make an electrical connection.

The controller 5032 is further electrically connected to the encoder 5033. A signal terminal 50331 of the encoder 5033 is electrically connected to the free terminal 50313 of the switch 5031.

Based on the above description, the working principle of the control circuit 503 is explained below. The controller 5032 judges and determines the type of an external audio device that establishes a connection with the earphone interface circuit 501 according to the received comparison result, and outputs corresponding audio signals according to the type of the external audio device. Specifically, when the external audio device is a digital audio device, the controller 5032 controls the branch where the free terminal 50311 of the switch 5031 lies to conduct, by which branch digital audio signals are transmitted. When the external audio device is an analog audio device, the controller 5032 controls the branch where the free terminal 50313 of the switch 5031 lies to conduct, by which branch left sound track analog audio signals are transmitted. In addition, the encoder 5033 further makes an electrical connection (not shown in the Figures) with the right sound track signal pin 50112 of the earphone socket. When the external audio device is an analog audio device, right sound track signals are transmitted.

In another embodiment, the right sound track signal pin 50112 and the microphone signal pin 50111 are further electrically connected to the controller 5032 to form an I2C data line. When the external audio device is a digital audio device, it is possible to transmit common data transmission and control signals via the I2C data line, where the common data signals refer to signals with a relatively low transmission rate.

In the present embodiment, the audio receiving device 60 includes an earphone plug 601. The earphone plug 601 includes a microphone signal terminal 6011, a right sound track signal terminal 6012, and a left sound track signal terminal 6013. The microphone signal terminal 6011 is connected to the ground terminal via the resistor R2; the right sound track signal terminal 6012 is connected to the ground terminal via the resistor R1; and the left sound track signal terminal 6013 is connected to the ground terminal via the resistor R4. The left sound track signal terminal 6013 is further connected to a terminal of a capacitor C1, and the other terminal of the capacitor C1 is connected to the decoder 602 and the resistor R3.

In the present embodiment, the left sound track signal terminal 6013 further needs to transmit high-speed digital signals, e.g., SPDIF/AES3 signals. In order to ensure transmission quality of the high-speed digital signals, a resistance value of a pull-down resistor R4 thereof is accordingly 75Ω.

Generally speaking, an impedance of an external analog audio device is not too large, for example, most-common 32Ω, 16Ω, 56Ω, 60Ω, or 15Ω, and 600Ω at maximum. An impedance input by the line is generally 600 Ω~10 kΩ, and is 20 kΩ at maximum. In order to distinguish the impedance of the above-mentioned external analog audio device and the impedance of the line, resistance values of the pull-down resistors of the microphone signal terminal 6011 and the right channel signal terminal 6012 are in the range of 43Kω~62 kΩ.

After the audio receiving device 60 establishes a connection with the earphone interface circuit 501 of the signal transmission circuit 50 via the earphone plug 601, the earphone plug 601 microphone signal terminal 6011 and the earphone interface circuit 501 microphone signal pin 50111 make an electrical connection; the earphone plug 601 right sound track signal terminal 6012 and the earphone interface circuit 501 right sound track signal pin 50112 make an electrical connection; and the earphone plug 601 left sound track signal terminal 6013 and the earphone interface circuit 501 left sound track pin 50113 make an electrical connection. At this time, the signal transmission circuit 50 acquires a voltage value corresponding to the impedance of the audio receiving device 60 via the comparison circuit 502, compares the voltage value with the reference voltage of the comparison circuit 502, and outputs the comparison result to the control circuit 503.

A specific working principle of the comparison circuit 502 is described herein. In the present embodiment, the resistance value of the resistor R11 is set to be 82KΩ, the resistance value of the resistor R12 is set to be 27 KΩ, the resistance value of the resistor R13 is set to be 39KΩ, and the voltage value of the power source V2 is set to be 3.3V. Thus, the voltage value of the first reference voltage V3, i.e., $$V_3 = \frac{27\,K\Omega + 39\,K\Omega}{82\,K\Omega + 27\,K\Omega + 39\,K\Omega} * 3.3V = 1.47V,$$

and the voltage value of the second reference voltage V4, i.e., $$V_4 = \frac{27\,K\Omega}{82\,K\Omega + 27\,K\Omega + 39\,K\Omega} * 3.3V = 0.87V$$

are calculated respectively according to Formulae I and II.

After the audio receiving device 60 establishes a connection with the signal transmission circuit 50, a pull-down resistor R2 of the microphone signal terminal 6011 of the audio receiving device 60 is connected in series with the resistor R5, and thus, the voltage value acquired by the comparison voltage terminals of the first comparison channel 5021 and the second comparison channel 5022 is $V_{mic}$ and can be calculated according to Formula III:

$$V_{mic} = \frac{R_2}{R_2 + R_5} * V_1, \quad \text{(Formula III)}$$

where $R_2$ is a resistance value of the resistor R2, $R_5$ is a resistance value of the resistor R5, and $V_1$ is a voltage value of the power source V1.

In the present embodiment, $R_5$=100 KΩ, $V_1$=3.3V. Thus, when the resistance value of the resistor R2 is 43KΩ, $V_{mic}$=0.992V; and when the resistance of the resistor R2 is 62KΩ, $V_{mic}$=1.26V. Then, the acquired voltage value $V_{mic}$ is greater than the voltage value of the second reference voltage V2 and smaller than the voltage value of the first reference voltage V1.

The pull-down resistor R1 of the right sound track signal terminal 6012 of the audio receiving device 60 is connected in series with the resistor R6, and then the voltage value acquired by the comparison voltage terminal of the third comparison channel 5023 is VR, and can be calculated according to formula IV:

$$V_R = \frac{R_1}{R_1 + R_6} * V_1, \quad \text{(Formula IV)}$$

where $R_1$ is a resistance value of the resistor R1, $R_6$ is a resistance value of the resistor R6, and $V_1$ is a voltage value of the power source V1.

In the present embodiment, $R_6$=100KΩ, $V_1$=3.3V, $R_1$=47KΩ, $V_R$=1.055V. Then, the acquired voltage value $V_R$ is greater than the voltage value of the second reference voltage V2.

The pull-down resistor R4 of the left sound track signal terminal 6013 of the audio receiving device 60 is connected in series with the resistor R7, and then the voltage value acquired by the comparison voltage terminal of the fourth comparison channel 5024 is $V_L$, and can be calculated according to formula V:

$$V_L = \frac{R_4}{R_4 + R_7} * V_1, \quad \text{(Formula V)}$$

where $R_4$ is a resistance value of the resistor R4, $R_7$ is a resistance value of the resistor R7, and $V_1$ is a voltage value of the power source V1.

In the present embodiment, $R_7$=100KΩ, $V_1$=3.3V, $R_4$=75Ω, $V_L$=0.0024V. Then, the acquired voltage value $V_L$ is smaller than the voltage value of the second reference voltage V2.

Based on the above analysis and the foregoing working principles of the respective comparison channels in the comparison circuit 502, it can be known that, according to the circuit designed in the present embodiment, the results output by the respective channels of the comparison circuit 502 are high level, and then, upon an AND operation, the output result is high level. At this time, the control circuit 503 determines the audio receiving device 60 to be a digital audio device according to the result, and then controls the switch 5031 to enable the branch where the free terminal 50311 lies to conduct, by which branch corresponding digital signals are transmitted.

In another embodiment, when the result output by the comparison circuit 502 is low level, the control circuit 503 determines the audio receiving device 60 to be an analog audio device according to the result, and correspondingly transmits analog audio signals.

Distinct from the prior art, the present embodiment, by means of characteristics of the circuit, acquires a voltage value corresponding to an impedance of the audio receiving device via the earphone interface circuit when the earphone interface circuit is connected to the audio receiving device, and then compares the acquired voltage value with a preset reference voltage, and determines the type of the audio receiving device according to the comparison result. When the audio receiving device is determined to be a digital audio device, the earphone interface circuit is switched to digital output, which realizes the function of compatible transmission of analog signals and digital signals via the earphone interface circuit and improves the user experience.

The present disclosure further provides an intelligent terminal, which includes a signal transmission circuit of any one of the foregoing embodiments. Moreover, the intelligent terminal according to the present embodiment is an intelligent terminal 10 in the signal transmission system of FIG. 1.

The structure and working principle of the intelligent terminal have been described above in detail, and will not be specifically described herein.

Distinct from the prior art, the present embodiment, by means of characteristics of the circuit, acquires a voltage value corresponding to an impedance of the audio receiving device via the earphone interface circuit when the earphone interface circuit is connected to the audio receiving device, and then compares the acquired voltage value with a preset reference voltage, and determines the type of the audio receiving device according to the comparison result. When the audio receiving device is determined to be a digital audio device, the earphone interface circuit is switched to digital output, which realizes the function of compatible transmission of analog signals and digital signals via the earphone interface circuit and improves the user experience.

Figure 4:
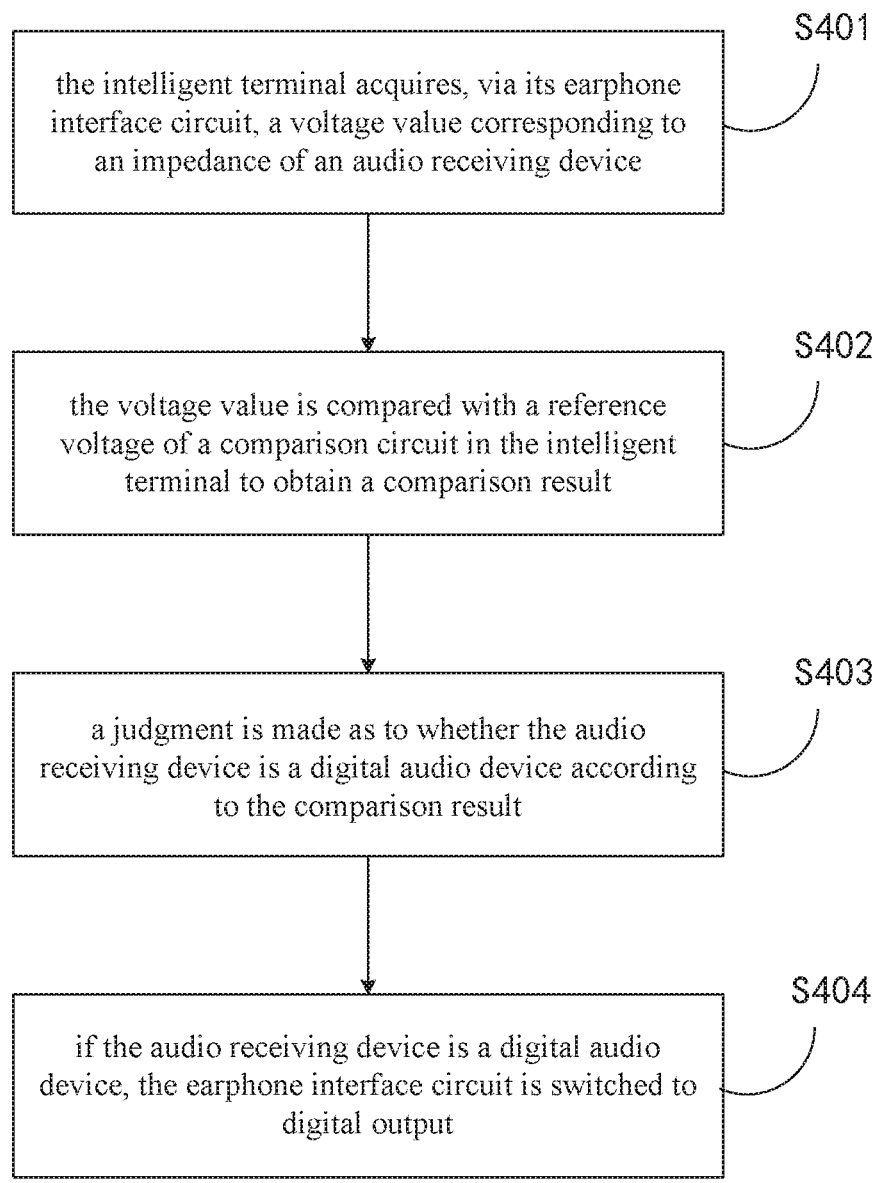
FIG. 4 is a schematic flowchart of an embodiment of a signal transmission method of the present disclosure.

Reference is made to FIG. 4, which is a schematic flowchart of an embodiment of a signal transmission method of the present disclosure. This method is applicable to the intelligent terminal of any of the foregoing embodiments. Specifically, the signal transmission method according to the present embodiment includes the following operations.

S401: the intelligent terminal may acquire, via its earphone interface circuit, a voltage value corresponding to an impedance of an audio receiving device.

The intelligent terminal may be a smart phone, a tablet computer, and an intelligent TV, without any specific limitation set herein.

In the present embodiment, the intelligent terminal acquires, via its earphone interface circuit, the voltage value corresponding to the impedance of the audio receiving device. The audio receiving device may be an earphone, a loudspeaker, and the like.

When the type of the audio receiving device is different, impedances of corresponding channels of the audio receiving device are different, so that voltages of the corresponding impedances are different. Specifically, the intelligent terminal acquires voltage values corresponding to the impedances of the sound tracks of the audio receiving device, such as a voltage value of an impedance corresponding to the left sound track and a voltage value of an impedance corresponding to the right sound track, while further acquiring a voltage value of an impedance corresponding to the microphone channel.

S402: the voltage value may be compared with a reference voltage of a comparison circuit in the intelligent terminal to obtain a comparison result.

In the present embodiment, the intelligent terminal includes a comparison circuit preset with a reference voltage. The intelligent terminal compares the acquired voltage value with the reference voltage of the comparison circuit. Further, the comparison circuit includes a plurality of comparison channels. Each of the comparison channels includes a comparison voltage terminal and a reference voltage terminal, and outputs a corresponding comparison result according to the circuit characteristics and a corresponding comparison processing manner. Moreover, the comparison results of the respective channels are subjected into an AND operation to obtain and output a final comparison result.

S403: a judgment may be made as to whether the audio receiving device is a digital audio device according to the comparison result.

In the present embodiment, the intelligent terminal judges and determines whether the audio receiving device is a digital audio device according to the comparison result. In one embodiment, when the comparison result is high level, the audio receiving device is a digital audio receiving device; and when the comparison result is low level, the audio receiving device is an analog audio receiving device.

S404: if the audio receiving device is a digital audio device, the earphone interface circuit may be switched to digital output.

In the present embodiment, if the audio receiving device is a digital audio device, the intelligent terminal switches the earphone interface circuit to digital output. Specifically, the audio receiving device includes a left sound track audio channel and a right sound track audio channel. When the audio receiving device is a digital audio device, one of the audio channels is selected to transmit corresponding digital audio signals.

Distinct from the prior art, the intelligent terminal according to the present embodiment acquires a voltage value corresponding to an impedance of the audio receiving device via the earphone interface circuit, then compares the acquired voltage value with a preset reference voltage, and determines the type of the audio receiving device according to the comparison result. When the audio receiving device is determined to be a digital audio device, the earphone interface circuit is switched to digital output, which realizes the function of compatible transmission of analog signals and digital signals via the earphone interface circuit and improves the user experience.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

The invention claimed is:

1. An intelligent terminal, wherein the intelligent terminal comprises a signal transmission circuit, the signal transmission circuit comprising: an earphone interface circuit, a comparison circuit, and a control circuit electrically connected in sequence;
wherein the earphone interface circuit is configured for connection to an audio receiving device, the earphone interface circuit comprises a first sound track, a second sound track, and a microphone channel, an input terminal of the first sound track being configured for connection to a first sound track of the audio receiving device, an input terminal of the second sound track being configured for connection to a second sound track of the audio receiving device, an input terminal of the microphone channel being configured for connection to a microphone channel of the audio receiving device;
wherein the comparison circuit is configured to acquire a voltage value corresponding to an impedance of the audio receiving device via the earphone interface circuit, the voltage value being compared with a reference voltage of the comparison circuit, to output a comparison result to the control circuit;
wherein an output terminal of the first sound track, an output terminal of the second sound track, an output terminal of the microphone channel are connected to the comparison circuit;
wherein the comparison circuit acquires a voltage value corresponding to an impedance of the microphone channel and compares the voltage value with a first reference voltage to obtain a first comparison result and compares the voltage value with a second reference voltage to obtain a second comparison result the comparison circuit acquires a voltage value corresponding to an impedance of the second sound track and the voltage value is compared with the second reference voltage to obtain a third comparison result the comparison circuit acquires a voltage value corresponding to an impedance of the first sound track and the voltage value is compared with the second reference voltage to obtain a fourth comparison result; and the comparison circuit performs a preset operation of the first comparison result, the second comparison result, the third comparison and the fourth comparison result to obtain and output a comparison result; and
wherein the control circuit judges whether the audio receiving device is a digital audio device according to the comparison result, and switches the earphone interface circuit to digital output when the audio receiving device is determined to be a digital audio device.

2. The intelligent terminal according to claim 1, wherein the comparison circuit comprises a first comparison channel, a second comparison channel, a third comparison channel, and a fourth comparison channel,
wherein an output terminal of the first sound track is connected to a first input terminal of the fourth comparison channel, an output terminal of the second sound track is connected to a first input terminal of the third comparison channel, and an output terminal of the microphone channel is connected to a first input terminal of the first comparison channel and a first input terminal of the second comparison channel, respectively;
wherein the first input terminal of the first comparison channel and the first input terminal of the second comparison channel respectively acquire a voltage value corresponding to an impedance of the microphone channel; the first comparison channel compares the voltage value with a first reference voltage to obtain a first comparison result; the second comparison channel compares the voltage value with a second reference voltage to obtain a second comparison result; the first input terminal of the third comparison channel acquires a voltage value corresponding to an impedance of the second sound track and the voltage value is compared with the second reference voltage to obtain a third comparison result; and the first input terminal of the fourth comparison channel acquires a voltage value corresponding to an impedance of the first sound track and the voltage value is compared with the second reference voltage to obtain a fourth comparison result.

3. The intelligent terminal according to claim 1, wherein the control circuit comprises a controller electrically connected to the comparison circuit, and a single-pole double-throw (SPDT) switch connected to the controller, the controller being configured to receive the comparison result output by the comparison circuit and to control a free terminal of the SPDT switch connected to a digital output channel of the earphone interface circuit to conduct when the audio receiving device is determined to be a digital audio device.

4. The intelligent terminal according to claim 3, wherein the control circuit further comprises an encoder connected to the controller, a signal terminal of the encoder being connected to a free terminal of the SPDT switch, the controller controlling the encoder to conduct via a free terminal of the SPDT switch connected to an analog output channel of the earphone interface circuit to conduct when the audio receiving device is determined to be an analog audio device.

5. The intelligent terminal according to claim 1, wherein the comparison circuit performs an AND operation of the first comparison result, the second comparison result, the third comparison result and the fourth comparison result, to obtain and output the comparison result.

6. The intelligent terminal according to claim 1, wherein the audio receiving device comprises an earphone plug, the earphone plug comprising: a microphone signal terminal, a right sound track signal terminal and a left sound track signal terminal, the microphone signal terminal, the right sound track signal terminal and the left sound track signal terminal being connected to the microphone channel, the first sound track, and the second sound track of the earphone interface circuit, respectively;
wherein the microphone signal terminal is connected to a ground terminal via a first pull-down resistor, the right sound track signal terminal is connected to the ground terminal via a second pull-down resistor, and the left sound track signal terminal is connected to the ground terminal via a third pull-down resistor, the left sound track signal terminal being further connected to a terminal of a first capacitor, the other terminal of the first capacitor being connected to a decoder and a fourth pull-down resistor.

7. The intelligent terminal according to claim 1, wherein an output terminal of the first sound track is connected to a terminal of a first resistor, the other terminal of the first resistor being connected to the first input terminal of the fourth comparison channel; an output terminal of the second sound track is connected to a terminal of a second resistor, the other terminal of the second resistor being connected to the first input terminal of the third comparison channel; and an output terminal of the microphone channel is connected to a third resistor, the other terminal of the third resistor being connected to the first comparison channel and the second comparison channel, respectively.

8. The intelligent terminal according to claim 7, wherein the output terminal of the first sound track and a terminal of the first resistor are connected to a terminal of a first pull-up resistor; the output terminal of the second sound track and a terminal of the second resistor are connected to a terminal of a second pull-up resistor; and the output terminal of the microphone channel and a terminal of the third resistor are connected to a terminal of a third pull-up resistor, each of the other terminals of the first pull-up resistor, the second pull-up resistor and the third pull-up resistor being connected to a power source.

9. A signal transmission method, wherein the signal transmission method comprises:
acquiring, by an intelligent terminal via an earphone interface circuit thereof, a voltage value corresponding to impedance of an audio receiving device;
comparing the voltage value with a reference voltage of a comparison circuit in the intelligent terminal to obtain a comparison result;
judging whether the audio receiving device is a digital audio device according to the comparison result;
if yes, switching the earphone interface circuit to digital output;
wherein the audio receiving device comprises a microphone channel, a first sound track, and a second sound track, and the operation of acquiring;
the operation of acquiring, by an intelligent terminal via an earphone interface circuit thereof, a voltage value corresponding to impedance of an audio receiving device comprises:
acquiring, by the intelligent terminal via the earphone interface circuit thereof, voltage values respectively corresponding to impedances of the first microphone channel, the first sound track and the second sound track of the audio receiving device; and
the operation of comparing the voltage value with a reference voltage of a comparison circuit in the intelligent terminal to obtain a comparison result comprises:
comparing the voltage value corresponding to the impedance of the microphone channel with a first reference voltage to obtain a first comparison result;
comparing the voltage value corresponding to the impedance of the microphone channel with a second reference voltage to obtain a second comparison result;
comparing the voltage value corresponding to the impedance of the second sound track with the second reference voltage to obtain a third comparison result;
comparing the voltage value corresponding to the impedance of the first sound track with the second reference voltage to obtain a fourth comparison result; and
processing the first comparison result, the second comparison result, the third comparison result, and the fourth comparison result according to a preset operation to obtain and output the comparison result.

10. The signal transmission method according to claim 9, wherein the comparison circuit comprises a first comparison channel, a second comparison channel, a third comparison channel, and a fourth comparison channel, and the operation of comparing the voltage value with a reference voltage of a comparison circuit in the intelligent terminal to obtain a comparison result comprises:
comparing, by the first comparison channel, the voltage value corresponding to the impedance of the microphone channel with a first reference voltage to obtain a first comparison result;
comparing, by the second comparison channel, the voltage value corresponding to the impedance of the microphone channel with a second reference voltage to obtain a second comparison result;
comparing, by the third comparison channel, the voltage value corresponding to the impedance of the second sound track with the second reference voltage to obtain a third comparison result; and
comparing, by the fourth comparison channel, the voltage value corresponding to the impedance of the first sound track with the second reference voltage to obtain a fourth comparison result.

11. The signal transmission method according to claim 9, wherein the preset operation comprises an AND operation.

12. A signal transmission circuit, wherein the signal transmission circuit comprises: an earphone interface circuit, a comparison circuit, and a control circuit electrically connected in sequence, wherein the earphone interface circuit is configured for connection to an audio receiving device, the earphone interface circuit comprises a first sound track, a second sound track, and a microphone channel, an input terminal of the first sound track being configured for connection to a first sound track of the audio receiving device, an input terminal of the second sound track being configured for connection to a second sound track of the audio receiving device, an input terminal of the microphone channel being configured for connection to a microphone channel of the audio receiving device;

wherein the comparison circuit is configured to acquire a voltage value corresponding to an impedance of the audio receiving device via the earphone interface circuit, the voltage value being compared with a reference voltage of the comparison circuit, to output a comparison result to the control circuit;

wherein an output terminal of the first sound track, an output terminal of the second sound track and an output terminal of the microphone channel are connected to the comparison circuit;

wherein the comparison circuit acquires a voltage value corresponding to an impedance of the microphone channel and compares the voltage value with a first reference voltage to obtain a first comparison result the comparison circuit compares the voltage value with a second reference voltage to obtain a second comparison result the comparison circuit acquires a voltage value corresponding to an impedance of the second sound track and the voltage value is compared with the second reference voltage to obtain a third comparison result the comparison circuit acquires a voltage value corresponding to an impedance of the first sound track and the voltage value is compared with the second reference voltage to obtain a fourth comparison result and the comparison circuit performs a preset operation of the first comparison result, the second comparison result, the third comparison and the fourth comparison result to obtain and output a comparison result; and wherein the control circuit judges whether the audio receiving device is a digital audio device according to the comparison result, and switches the earphone interface circuit to digital output when the audio receiving device is determined to be a digital audio device.

13. The signal transmission circuit according to claim 12, wherein the comparison circuit comprises a first comparison channel, a second comparison channel, a third comparison channel, and a fourth comparison channel, wherein an output terminal of the first sound track is connected to a first input terminal of the fourth comparison channel, an output terminal of the second sound track is connected to a first input terminal of the third comparison channel, and an output terminal of the microphone channel is connected to a first input terminal of the first comparison channel and a first input terminal of the second comparison channel, respectively;

wherein the first input terminal of the first comparison channel and the first input terminal of the second comparison channel respectively acquire a voltage value corresponding to an impedance of the microphone channel; the first comparison channel compares the voltage value with a first reference voltage to obtain a first comparison result; the second comparison channel compares the voltage value with a second reference voltage to obtain a second comparison result; the first input terminal of the third comparison channel acquires a voltage value corresponding to an impedance of the second sound track and the voltage value is compared with the second reference voltage to obtain a third comparison result; and the first input terminal of the fourth comparison channel acquires a voltage value corresponding to an impedance of the first sound track and the voltage value is compared with the second reference voltage to obtain a fourth comparison result.

14. The signal transmission circuit according to claim 12, wherein the comparison circuit performs an AND operation of the first comparison result, the second comparison result, the third comparison result, and the fourth comparison result to obtain and output the comparison result.

15. The signal transmission circuit according to claim 12, wherein the audio receiving device comprises an earphone plug, the earphone plug comprising: a microphone signal terminal, a right sound track signal terminal and a left sound track signal terminal, the microphone signal terminal, the right sound track signal terminal and the left sound track signal terminal being connected to the microphone channel, the first sound track, and the second sound track of the earphone interface circuit, respectively;

wherein the microphone signal terminal is connected to a ground terminal via a first pull-down resistor, the right sound track signal terminal is connected to the ground terminal via a second pull-down resistor, and the left sound track signal terminal is connected to the ground terminal via a third pull-down resistor, the left sound track signal terminal being further connected to a terminal of a first capacitor, the other terminal of the first capacitor being connected to a decoder and a fourth pull-down resistor.

16. The signal transmission circuit according to claim 12, wherein an output terminal of the first sound track is connected to a terminal of a first resistor, the other terminal of the first resistor being connected to the first input terminal of the fourth comparison channel; an output terminal of the second sound track is connected to a terminal of a second resistor, the other terminal of the second resistor being connected to the first input terminal of the third comparison channel; and an output terminal of the microphone channel is connected to a third resistor, the other terminal of the third resistor being connected to the first comparison channel and the second comparison channel, respectively.

17. The signal transmission circuit according to claim 16, wherein the output terminal of the first sound track and a terminal of the first resistor are connected to a terminal of a first pull-up resistor; the output terminal of the second sound track and a terminal of the second resistor are connected to a terminal of a second pull-up resistor; and the output terminal of the microphone channel and a terminal of the third resistor are connected to a terminal of a third pull-up resistor, each of the other terminals of the first pull-up resistor, the second pull-up resistor and the third pull-up resistor being connected to a power source.

18. The signal transmission circuit according to claim 12, wherein the control circuit comprises a controller electrically connected to the comparison circuit, and a single-pole double-throw (SPDT) switch connected to the controller, the controller being configured to receive the comparison result output by the comparison circuit and to control a free terminal of the SPDT switch connected to a digital output channel of the earphone interface circuit to conduct when the audio receiving device is determined to be a digital audio device.

19. The signal transmission circuit according to claim 18, wherein the control circuit further comprises an encoder, the encoder being connected to the controller, a signal terminal of the encoder being connected to a free terminal of the SPDT switch, the controller controlling the encoder to conduct via a free terminal of the SPDT switch connected to an analog output channel of the earphone interface circuit to conduct when the audio receiving device is determined to be an analog audio device.

* * * * *